May 11, 1954     J. VERDERBER     2,678,072
FLUID OPERATED CLAMPING DEVICE
Filed July 27, 1950     4 Sheets-Sheet 1

INVENTOR.
JOSEPH VERDERBER
BY William Isler
ATTORNEY

May 11, 1954

J. VERDERBER 2,678,072

FLUID OPERATED CLAMPING DEVICE

Filed July 27, 1950

INVENTOR.
JOSEPH VERDERBER
BY
William Isler
ATTORNEY.

May 11, 1954 — J. VERDERBER — 2,678,072
FLUID OPERATED CLAMPING DEVICE
Filed July 27, 1950 — 4 Sheets-Sheet 3

INVENTOR.
JOSEPH VERDERBER
BY William Soler
ATTORNEY.

May 11, 1954 J. VERDERBER 2,678,072
FLUID OPERATED CLAMPING DEVICE
Filed July 27, 1950 4 Sheets-Sheet 4

INVENTOR.
JOSEPH VERDERBER
BY
William Soler
ATTORNEY.

Patented May 11, 1954

2,678,072

UNITED STATES PATENT OFFICE 2,678,072

FLUID OPERATED CLAMPING DEVICE

Joseph Verderber, Cleveland, Ohio

Application July 27, 1950, Serial No. 176,140

4 Claims. (Cl. 144—290)

The present invention relates to clamping devices and more particularly to a fluid operated clamping device such as a jig for holding workpieces during machining operations.

This application is a continuation-in-part of my copending application, Serial No. 162,557, filed May 17, 1950, now Patent No. 2,663,339, wherein are disclosed and claimed certain features of the invention also shown and described herein.

I have found that in utilizing the clamping device described in my said copending application, certain disadvantages result from the fact that air, which is a compressible fluid, is used as the sole medium for actuating the device.

The present application describes a clamping device which is an improvement upon that disclosed in said copending application, in that it is actuated by a combination of a compressible fluid, such as air, and a non-compressible fluid, such as oil. I thereby obtain more favorable operating characteristics in the device and overcome the disadvantages which flow from using solely a compressible fluid medium.

It is a primary object of my invention to provide a quick-acting clamping device which is actuated by fluid pressure.

Another object of my invention is to provide a fluid operated clamping device which will maintain a uniform clamping action irrespectively of fluctuations in or failure of pressure.

Still another object of my invention is to provide a clamping device which is semi-automatic in operation, requiring only control by the operator.

Other objects and advantages of the invention will be apparent during the course of the following description.

In the accompanying drawings, forming a part of this specification, and in which like numerals are employed to designate like parts throughout the same, Fig. 1 is a top plan view of a clamping jig embodying the features of my invention.

Fig. 6 is an enlarged fragmentary cross-sectional view taken on line 6—6 of Fig. 2 and showing the valve stem in neutral position.

Fig. 7 is a view similar to Fig. 6, but showing the position of the valve stem when it is desired to release the clamp.

Figures 1, 2:
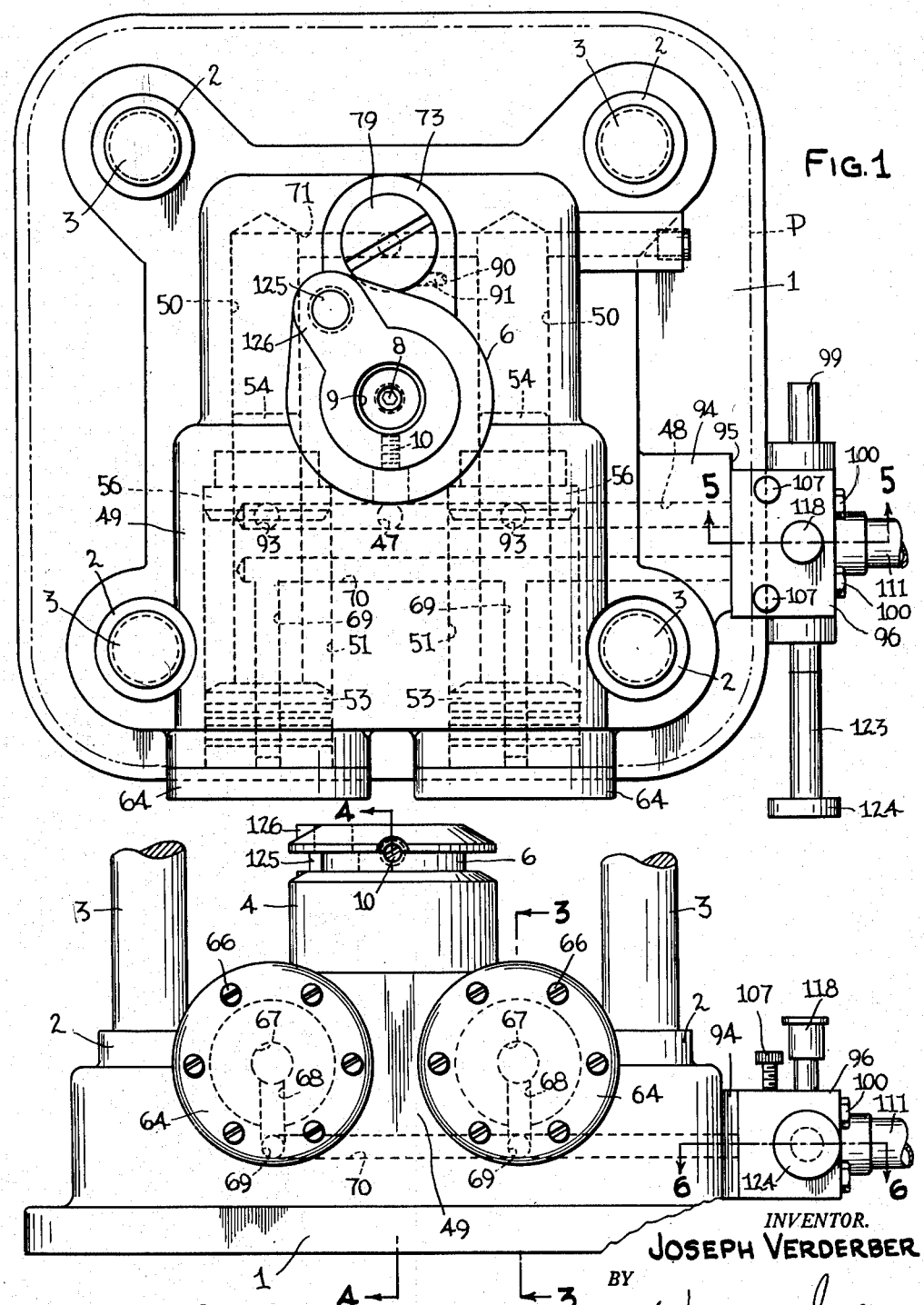
Fig. 2 is a front elevation of the same.

Referring more particularly to the drawings, the clamping device is seen to comprise a base portion 1 having formed integrally therewith four spaced embossments 2 in which are mounted vertically extending standards 3 to which are threadedly secured a top plate P, which is indicated in broken line outline.

The plunger assembly

Extending vertically from the base 1 and integrally formed therewith is an embossment 4 which is bored as at 5 to form a cylinder in which is slidably mounted a plunger 6. The plunger 6 is provided with a longitudinal bore 7 which is tapped to threadedly receive a plug 8, for a purpose to be described hereinafter. The bore 7 is counterbored, as at 9, to form a socket which may be utilized for holding a locating pin or the like for accurately positioning the workpiece which is to be clamped. The locating pin may be secured by a set screw 10 which threadedly engages a radially extending bore 11 in the wall of the plunger.

The opposite end of the plunger 6 is counterbored as at 12 to form a cylindrical cavity or chamber 13 having a closed upper end 14.

Disposed within the cavity 13 is a stationary divider 15 which is substantially in the form of a piston having a head 16 from which depends an integral rod or stem 17. The head is provided with a circumferential recess 18 which serves to retain an O-ring 19 which has wiping engagement with the wall of the cavity 13.

The stem projects downwardly through a plug 20 which is threadedly secured to the lower end of the plunger 6. The plug has an annular cavity 21 which serves to contain an oil seal 22 which encircles the stem 17. For convenience in effecting assembly of the plug to the plunger, spaced spanner openings 23 are provided in the plug 20.

The stem 17 has an extension 24 of reduced diameter which projects through a cap 25 which is secured to the underside 46 of the base 1 by means of screws 26. The stem terminates in a threaded portion 27 which receives a nut 28 so as to secure the stem against displacement relatively to the cap 25.

The divider 15 has an axial closed-end bore 29 which terminates a short distance above the end of the stem extension 24. The bore 29 is counterbored as at 30, which counterbore extends through the head 16 and the stem 17 to a point near the end of bore 29 thereby forming a shoulder 31. A tube 32 having an internal diameter equal to that of bore 29 and having an external diameter less than that of bore 30, is axially disposed in the bore 30, it being secured against the shoulder 31 by means of a hollow set screw 33, which is threadedly secured in the bore 30 and abuts the upper end of the tube 32. A second hollow set screw 34 serves as a locking screw. The screws 33 and 34 serve as extensions of the bore 29 and a ring gasket 35 is interposed between the screws in order to prevent leakage of fluid around the threads.

The bore of the tube 32 thus provides an extension of the bore 29 of the divider 15, which bore communicates with a portion A of the chamber 13 which lies above the head 16. The tube 32 also defines an annular passageway 36 in the stem 17, which passageway communicates with a portion B of the chamber 13, which underlies the head 16, by means of a diametrical opening 37 which is provided in the stem 17.

The cap 25 which fits snugly on the extension 24 of the stem, has a channel or passageway 38 formed therein which communicates with the upper face 39 of the cap and then extends radially or laterally to the bore 40 of the cap 25 where it communicates with a radial opening 41 in stem 17 which leads to the bore 29. Another channel 42 which is 180 degrees removed from channel 38 extends downwardly from the face 39 of cap 25 and then laterally to the bore 40, where it communicates with a radial opening 43 in the stem which is located above the shoulder 31 and therefore leads to the annular passageway 36 in the bore 30 of the stem.

In order to maintain proper registry between the radial openings 41 and 43 in the stem extension 24 and the channels 38 and 42 respectively in the cap 25, the bore 40 of the cap is provided with a longitudinal recess or keyway 44 which slidably receives a key 45 which is secured to the stem extension 24.

The piston assembly

The underside 46 of the base has a vertically extending opening 47 therein which is in registry with the channel 42 in cap 25 and communicates with a horizontally extending transverse channel 48 which is provided in the body portion 49 of the clamping device and leads to the exterior thereof.

The body 49 is provided with two spaced horizontally extending closed-end bores 50 which form cylinders and which are counterbored to form larger cylinders 51 and annular shoulders 52. Each cylinder 51 has slidably mounted therein a movable piston 53 having an integral stem or rod 54 which is slidably received in the cylinder or bore 50. Axially spaced piston rings 55 are mounted on the piston so as to have wiping engagement with the wall of cylinder 51 and thereby prevent leakage of fluid past the piston. The stem 54 projects through a sealing ring 56 which is threadedly secured in the bore 51 in abutment with the shoulder 52. The sealing ring is provided with an annular recess 57 in which is retained an O-ring 58 which encircles the stem 54. Another O-ring 59 serves to prevent leakage around the threads of the sealing ring 56.

Vertical channels 93 lead from the passageway 48 to the bores or cylinders 51.

Surmounting the piston 53 is a flat spring 60 which is secured to the piston by means of a washer 61 and screw 62. Underlying and cushioning the spring is a resilient ring 63.

A cap 64 having an annular embossment 65 serves to close the open end of cylinder 51 and is secured to the body by means of screws 66. The embossment 65 is recessed as at 67 to provide clearance for the head of the screw 62 and the embossment is further recessed or slotted radially thereof to provide a channel 68 which communicates with a channel 69 formed in the body. The channel 69 communicates with a transverse channel 70 which leads to the exterior of the body for a purpose which will be fully described hereinafter.

The piston 53 partitions the cylinder 51 into two portions. A portion C lying between the piston and cap 64, and a portion D disposed between the piston and sealing ring 56.

The check valve

The cylinders 50 are intersected by a transverse channel 71 which communicates with the bore 72 of a check valve housing 73. The bore 72 is counterbored as at 74 to receive a cylinder bushing 75 in which is slidably mounted a piston 76 having an integral depending stem 77. An O-ring 78 encircles the piston and has wiping engagement with the bushing 75. The bore 74 is closed by means of a cap 79 which is threadedly secured therein.

The top 80 of the piston is tapered or conical in form and a free space S is left between the cap 79 and the bushing 75, into which space, the conical portion of the piston 76 can project for a purpose to be described hereinafter.

The other end of the bore 72 is counterbored as at 81 to provide a tapered or conical shoulder 82 against which is seated a ball check 83. The ball 83 is resiliently maintained in sealing engagement with the bore 72 by means of a coil spring 84 which is seated in a cylindrical ball stop element 85 which is secured in the bore 81.

The channel 38 in the cap 25, which is plugged as at 86, has a vertical portion 87 which communicates with the bore 81 of the check valve through the element 85.

Figure 4:
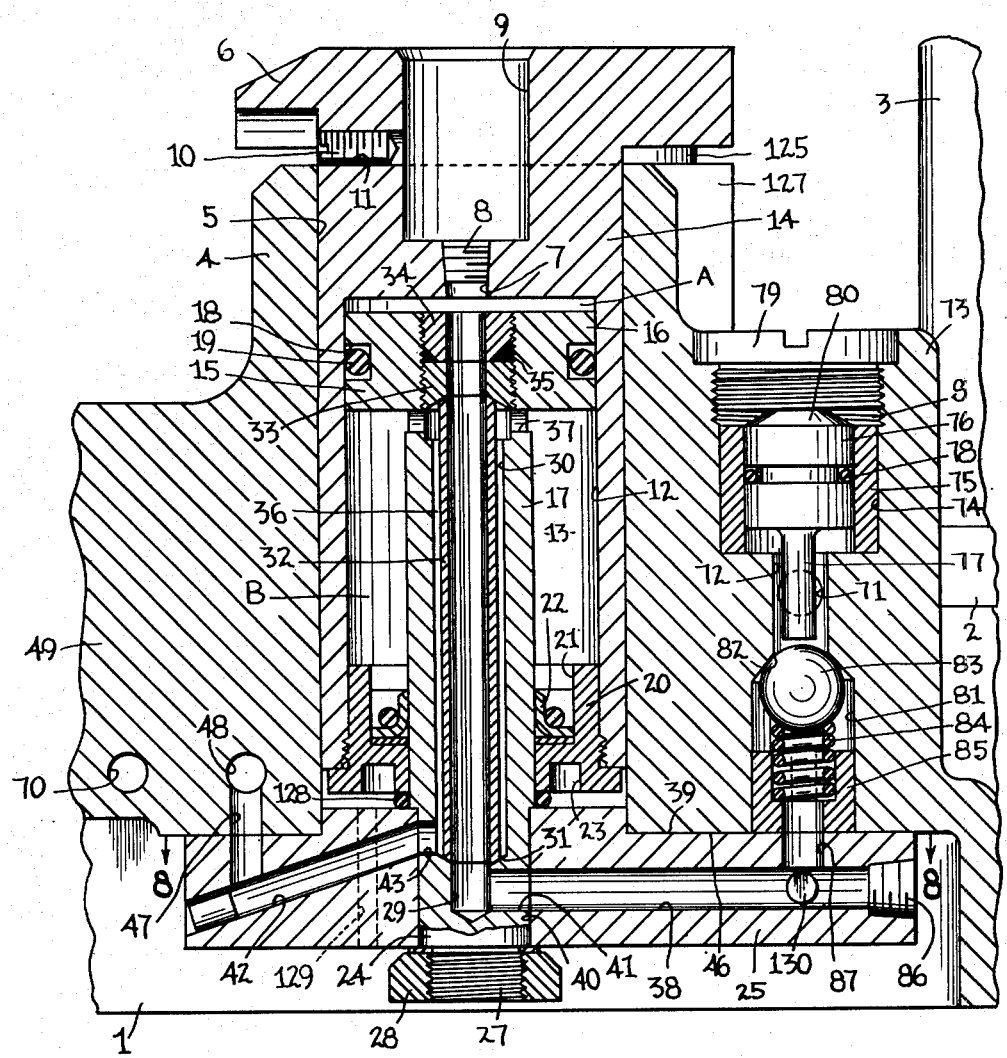
Fig. 4 is an enlarged fragmentary cross-sectional view, taken as indicated by line 4—4 on Fig. 2.
Figure 5:
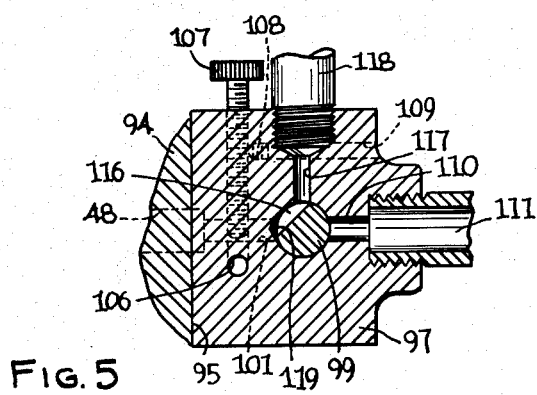
Fig. 5 is an enlarged fragmentary cross-sectional view, taken on line 5—5 of Fig. 1, and showing certain details of the valve structure.

It will be noted that when the piston 76 is in its uppermost position, as seen in Fig. 4, the end of the stem 77 terminates slightly above the ball 83.

Figure 8:
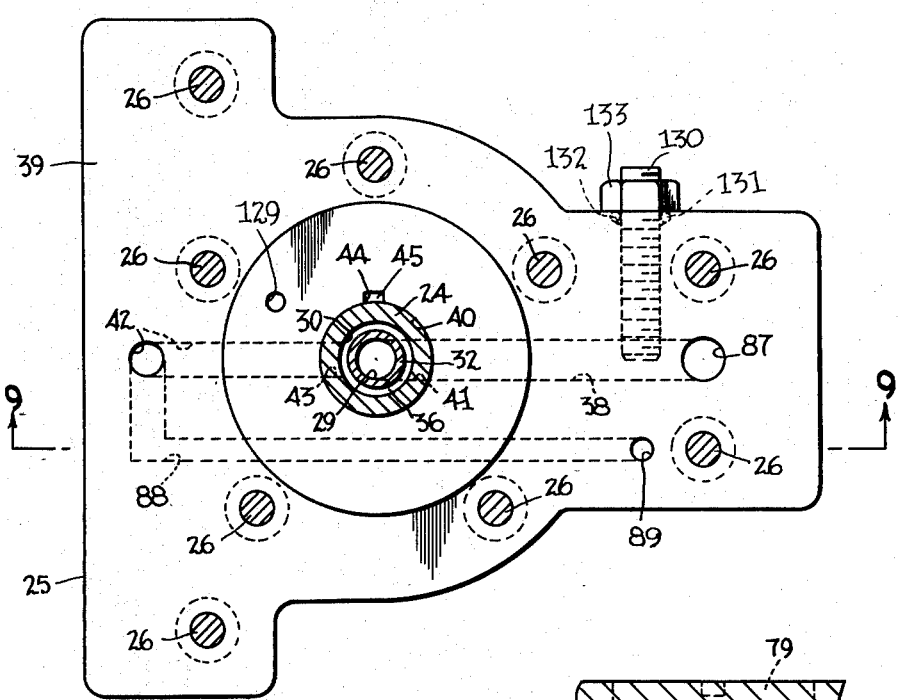
Fig. 8 is a cross-sectional view, taken substantially as indicated by line 8—8 of Fig. 4 and showing the cylinder closing plug in plan.
Figure 9:
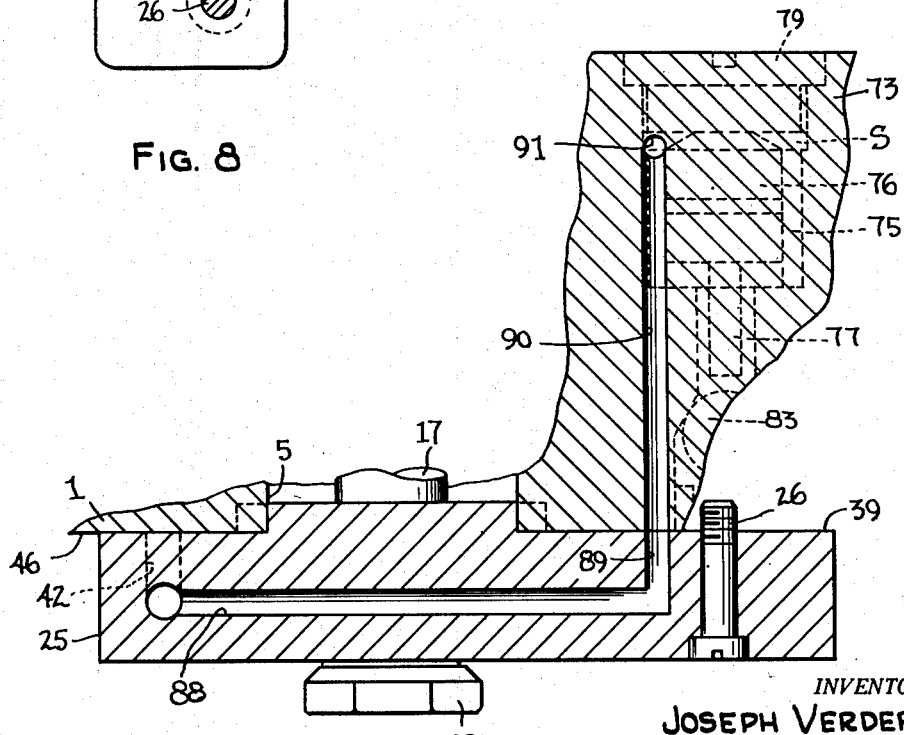
Fig. 9 is a fragmentary cross-sectional view of the device showing the by-pass channels to the check valve, the cutting plane being indicated at line 9—9 of Fig. 8.

As best seen in Figs. 1, 8 and 9, the channel 42 in cap 25 is intercepted by a by-pass channel 88 in the cap which runs horizontally through the cap and has a vertical branch 89 which communicates with a vertical channel 90 in the valve housing 73. The channel 90, in turn, has a laterally extending branch 91 which communicates with the space S in the bore 74 of the check valve assembly, thus interconnecting the space S with the transverse channel 48 in the body 49.

The control valve

Projecting laterally from one side of the body 49 is an embossment 94 having a flat face 95 which serves as a mounting surface for a control valve 96 which communicates with the channels 48 and 70.

The valve 96 comprises a valve body 97 having a central longitudinal bore 98 therethrough in which is slidably received a valve stem 99. The valve is secured to the boss 94 by means of bolts 100 which extend through the body 97. The valve body has two horizontally spaced passageways 101 and 102, one of which leads from channel 48 to the bore 98 and the other of which leads from channel 70 to bore 98.

In the same plane as channels 101 and 102 and parallel thereto, but spaced outwardly therefrom are two additional channels 103 and 104 which lead from the bore 98 to spaced vertical channels 105. The channels 105, in turn, communicate with a transverse exhaust channel 106 which is open to atmosphere. Each channel 105 is tapped to receive a thumb screw 107 which can be threadedly adjusted to fully or partially intercept or block the channels 103 and 104 for the purpose of controlling the air flow. In order to retain the thumb screw firmly in any selected position and to prevent it from being jarred or loosened by vibrations, it is releasably secured by a set screw 108 which is disposed in a tapped opening 109 in the body 97 of the valve.

An inlet channel 110 in the body 97 leads from the bore 98 to an air conduit 111 which is threadedly secured to the valve body.

Two axially spaced diametrical openings 112, 113 are provided in the valve stem 99, which openings are adapted to communicate alternately with the air inlet 110. Each of the openings 112, 113 terminates in an elongated groove or cavity 114 and 115, respectively, adjacent the openings 101 and 102, the groove 114 being of such dimension as to traverse the channels 101 and 103, and the groove 115 traversing openings 102 and 104.

At a point on the valve stem 99 which lies intermediate the openings 112 and 113, a narrow inclined groove or slot 116 is provided. The upper end of the slot communicates with the inlet channel 117 of a gravity oiler 118 which is threadedly secured to the valve body 97. The lower end of the groove 116 is directed toward a shallow depression or pocket 119 which is formed in the wall of the bore 98.

The valve stem 99 fits snugly in the bore 98 and has O-rings 120 mounted thereon to prevent leakage of air around the stem. Reciprocal sliding movement of the valve stem is limited by a dog-point set screw 121 which is threadedly secured in the body 97 so as to project into a recess 122 of predetermined length which is provided on the valve stem.

To one end of the valve stem is threadedly secured an extension rod 123 having a knob 124 which facilitates manipulation of the valve stem.

*The operation of the device*

In order to prepare the device for utilization, the plug 8 is removed and a non-compressible fluid such as light oil is poured through the opening 7. The oil fills the portion A of chamber 13 as well as the bore 29 in the stem 17, the channel 38 in the cap 25, and the bore 81 of the check valve. By manually depressing the ball 83, the oil is also caused to flow into channel 71 and thus into cylinders 50. The plug 8 is then replaced so as to close the cylinder 13.

The work-piece which is to be clamped is placed on top of the plunger 6 so that it may be clamped between the plunger and the conventional top plate P which is carried by the standards 3.

In Fig. 6 I have shown the stem of the control valve 96 in a neutral position. If the conduit 111 be connected to a source of compressed air and the valve stem 99 be moved upwardly (as viewed in Fig. 6), the air will pass through opening 113 in the valve stem and will be directed by groove 115 into channels 102 and 70. The air then passes into channels 69 in the body 49 and thence through recess 68 in the cap 64 into the portion C of each of the cylinders 51.

Figure 3:
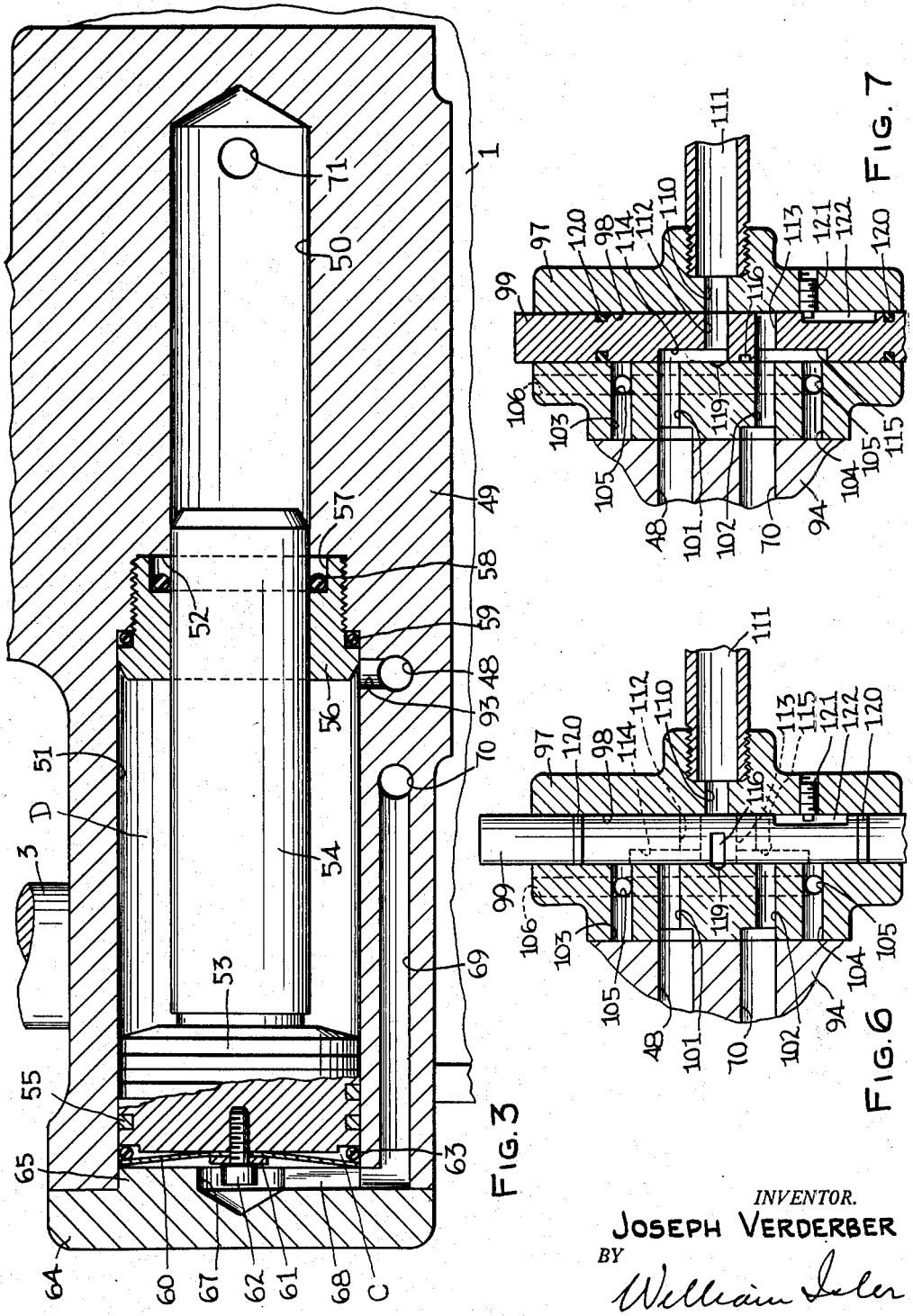
Fig. 3 is a fragmentary cross-sectional view on an enlarged scale, taken as indicated by line 3—3 on Fig. 2.

The pressure on the movable piston 53 causes the piston to be displaced to the right (as viewed in Fig. 3) and the corresponding movement of stem 54 forces the oil in cylinder 50 to flow through channel 71 to bore 72 of the check valve. The oil under pressure raises check valve piston 76 and depresses the ball 83 and flows past the ball into channel 38 in cap 25 and then through opening 41 in stem extension 24 into the bore 29 and thus to the portion A of chamber 13.

Inasmuch as the divider 15 is stationary, the pressure acts upon the closed end 14 of the plunger 6 to elevate it relatively to the divider and thereby clamp the work-piece against the top plate P.

The upward movement of plunger 6 is aided and guided by a guide rod 125 which is secured in a laterally extending ear 126 on the plunger and which is slidably contained in a cylindrical embossment 127 which is provided adjacent the embossment 4.

During the upward movement of the plunger 6, the air which is in the cavity B is forced out through radial opening 37 in the stem 17 and through the annular passageway 36 into channel 42 in cap 25, into channel 48 and thus into channel 101 of the control valve 96 where it is directed by groove 114 into channel 103, channel 105, and exhaust channel 106. The rate at which the air is permitted to exhaust can be controlled by the screw 107 and thus the clamping action of the plunger 6 can be slow or rapid, as desired.

As soon as the plunger 6 has clamped the work-piece, the pressure of the oil on the ball check 83 is equalized and the spring 84 returns the ball to its seat 82 whereby to seal the bore 72 of the check valve. Thus, if for any reason, the air pressure should fluctuate or fail entirely, the oil in cavity A will still remain under pressure and the plunger 6 will retain the work-piece in clamped position at a uniform pressure.

When the machining operations on the work-piece have been finished, and it is desired to release the work-piece, the valve stem 99 of the control valve is moved to the position shown in Fig. 7. The compressed air then enters the channels 101 and 48. The air entering channel 48 has three separate, but correlated, functions and takes three paths to accomplish these functions.

Firstly, the compressed air passes from channel 48 downwardly thru channel 47 into channel 42 in cap 25, then thru radial opening 43 in stem extension 24 and upwardly through annular passageway 36 and opening 37 into portion B of cavity or chamber 13. The pressure acts on the plug 20 to force the plunger downwardly in the bore 5 and thus release the work-piece.

At the same time, the air flows from channel 42 in cap 25 through bypass channel 88, channel 89, channel 90 in valve housing 73, and through channel 91 into the space S above the piston 76 in the bore 74 of the check valve. The air pressure acting upon the conical surface 80 forces the piston 76 and its stem 77 downwardly in the cylinder bushing 75 and the stem engages and depresses the ball 83 thereby opening the bore 72 to the return flow of oil from the chamber A. The return flow of the oil follows in reverse sequence the path heretofore described and thus flows into the reservoir 50 through channel 71.

The return flow of the oil is assisted and accelerated by the passage of the compressed air from channel 48 upwardly through channel 93 into the cavity D of bore 51 where it acts upon the piston 53 to move it to the left (as viewed in Fig. 3) as this tends to suck the oil into the reservoir 50.

The air in chamber C of the cylinder 51 is forced out through channel 68, channel 69, channel 70 and into channel 102 in control valve 96 where it is directed by groove 115 into channels 104 and 105 and exhausts through channel 106. The rate of exhaust through channel 104 may be controlled by means of the screw 107 in the manner heretofore described.

A resilient ring 128 is provided between the surfaces of the plug 20 and the cap 25 so as to avoid any jarring to the plunger 6 when it reaches the limit of its downward movement. A vent opening 129 in cap 25 prevents any air binding between the cap 25 and the plunger 6.

In addition to the control available through manipulation of the screws 107 on control valve 96, I also provide means for controlling the flow of oil comprising an element 130 which is threadedly secured in the cap 25 laterally thereof so as to adjustably intercept the channel 38 through which the oil must flow. By adjusting the element 130, the rate of flow of the oil can be controlled. Thus by combining the control functions of the screws 107 and the element 130, I can adjust the operation of the clamping device so as to obtain a combination of quick clamping-slow release, or quick clamping-quick release, or slow clamping-quick release, or slow clamping-slow release.

Leakage of the oil past the element 130 is prevented by an O-ring 131 which is mounted in a recess 132 in the cap 25 and secured therein by means of a nut 133.

As disclosed in my copending application heretofore referred to, the control valve 96 includes novel means for lubricating the wall of bore 12. The groove 116 on the valve stem 99 is so disposed that it will collect oil which drips from the oiler 118 into the bore 98 through the inlet 119. As the valve stem is moved from one extreme of position to the other during the operation of the clamping device, a droplet of lubricant from the groove 116 collects in the pocket 119. The sudden impingement of the compressed air entering through either channel 112 or 113, as the valve stem is manipulated, causes the lubricant in the pocket to be atomized and carried by the air stream into the cavity 13 where it serves to lubricate the walls of bore 12.

Having thus described my invention, I claim:

1. In a clamping device, the combination of a slidable hollow plunger, a stationary piston contained within said plunger, a liquid reservoir, pneumatically actuated means for displacing said liquid from said reservoir and injecting it into said plunger to displace said plunger relatively to said piston, and means for selectively directing air under pressure into said plunger to displace said liquid and return said plunger to its initial position, said air also being simultaneously directed against said first-named means to effect retraction thereof.

2. In a clamping device, the combination of a base, a top plate supported by said base, a clamping bar slidably mounted in said base, a first fluid motor provided in said base and operatively engaging said clamping bar, a liquid reservoir provided in said base, a fluid passageway in said base between said reservoir and said first fluid motor, a second fluid motor provided in said base, a rod operatively connected to said second fluid motor and extending into said reservoir, means for directing compressed air into said second fluid motor to cause advancement of said rod into said reservoir and responsive advancement of said clamping bar toward said top plate in response to hydraulic actuation of said first fluid motor, and means for directing compressed air simultaneously into said first fluid motor and said second fluid motor to cause retraction of said clamping bar and concurrent retraction of said rod whereby said first fluid motor exerts positive pressure on said liquid and said second fluid motor exerts negative pressure on said liquid to return it to said reservoir.

3. In a clamping device, the combination of a top plate, a clamping bar, a first fluid motor for actuating said clamping bar, said fluid motor comprising a first cylinder, and a first piston mounted in said cylinder and defining two chambers therein, a second fluid motor comprising a second cylinder, and a second piston slidably mounted in said second cylinder and defining two chambers therein, a liquid reservoir, a piston rod secured to said second piston and extending into said reservoir, a fluid passageway from said reservoir communicating with one of said chambers of said first cylinder, control means for selectively directing compressed air into one of said chambers of said second cylinder to cause said piston rod to advance into said reservoir and displace the liquid therein whereby to actuate said first fluid motor and advance said clamping bar toward said top plate, and control means for selectively directing compressed air simultaneously into the other of said chambers of said first and second cylinders to cause retraction of said clamping bar and retraction of said piston rod whereby said liquid is returned through said passageway to said reservoir in response to a positive pressure thereon in said first cylinder and a negative pressure thereon in said reservoir.

4. In a clamping device, the combination of a first cylinder, a first piston mounted in said cylinder and defining two chambers therein, a second cylinder, a second piston slidably mounted in said second cylinder and defining two chambers therein, a liquid reservoir, a piston rod secured to said second piston and extending into said reservoir, a passageway from said reservoir communicating with one of said chambers of said first cylinder, control means for selectively directing compressed air into one of said chambers of said second cylinder to cause said piston rod to advance into said reservoir and displace the liquid therein whereby said displaced liquid enters said one chamber of said first cylinder to cause relative movement between said first cylinder and said first piston, and control means for selectively directing compressed air simultaneously into the other of said chambers of said first and second cylinders to cause said liquid to be returned to said reservoir in response to a reversal of movement between said first cylinder and said first piston and the withdrawal of said piston rod from said reservoir.

References Cited in the file of this patent

UNITED STATES PATENTS

| Number | Name | Date |
| --- | --- | --- |
| 706,683 | Reynders et al. | Aug. 12, 1902 |
| 1,441,097 | Laughlin | Jan. 2, 1923 |
| 1,552,768 | Smith | Sept. 8, 1925 |
| 1,764,911 | Treat | June 17, 1930 |
| 2,362,339 | Armington | Nov. 7, 1944 |
| 2,409,254 | Conzelman | Oct. 15, 1946 |
| 2,410,978 | Kelly | Nov. 12, 1946 |
| 2,413,876 | Lefler | Jan. 7, 1947 |
| 2,482,792 | Owen | Sept. 27, 1949 |
| 2,490,823 | Manning | Dec. 13, 1949 |
| 2,504,406 | Gandrup | Apr. 18, 1950 |